United States Patent

Martin, Jr.

[11] 4,210,971
[45] Jul. 1, 1980

[54] LONG DISTANCE UNDERWATER COMMUNICATION

[75] Inventor: William H. Martin, Jr., Morris Township, Morris County, N.J.

[73] Assignee: The United States of America as represented by the Secretary of the Navy, Washington, D.C.

[21] Appl. No.: 308,293

[22] Filed: Sep. 11, 1963

[51] Int. Cl.$^2$ .............................................. H04B 1/02
[52] U.S. Cl. ................................... 367/134; 367/137
[58] Field of Search .................. 340/3, 3 FM, 3 C, 5, 340/8, 10, 12; 318/146, 147, 163, 164, 464; 322/31, 36; 290/51; 367/134, 137

[56] References Cited

U.S. PATENT DOCUMENTS

| 2,419,637 | 4/1947 | Gabriel et al. ...................... 322/36 X |
| 2,977,568 | 3/1961 | Roshon, Jr. et al. ................ 367/102 |

OTHER PUBLICATIONS

Wood, "A Textbook of Sound", The MacMillan Co., 1955, pp. 79, 81 & 82.

*Primary Examiner*—Richard A. Farley
*Attorney, Agent, or Firm*—Richard S. Sciascia; Arthur A. McGill; Prithvi C. Lall

EXEMPLARY CLAIM

1. A transmitter for use in long distance underwater communication comprising:
   (a) an electrostrictive transducer operable for radiating at least one hundred kilowatts of acoustic power into sea water in a frequency band fifty to one hundred cycles wide about a median frequency below five hundred cycles per second,
   (b) an alternating current generator for supplying essentially sinusoidal electric signal power to the transducer,
   (c) a dummy load approximating the load characteristics of the transducer,
   (d) a transformer for coupling output power of the generator to one of the transducer and dummy load,
   (e) a switching device between the transformer and the transducer and dummy load,
   (f) an engine directly coupled to the alternator and operable with said generator at a very low coefficient of fluctuation, on the order of 1 part in 80,000,
   (g) and means for controlling the engine speed in steps for changing the frequency of the generated power from any one of a plurality of equally spaced frequency steps within the band about six cycles apart to any other of the frequency steps within the band in less than ten seconds and then changing frequency at an essentially linear rate of two cycles per second per minute in a fixed length of time on the order of one to five minutes duration to the next higher or lower frequency step and then in less than ten seconds thereafter setting the frequency at any of the frequency steps within the band and changing frequency at an essentially linear rate in the same fixed length of time to the next higher or lower frequency step.

1 Claim, 1 Drawing Figure

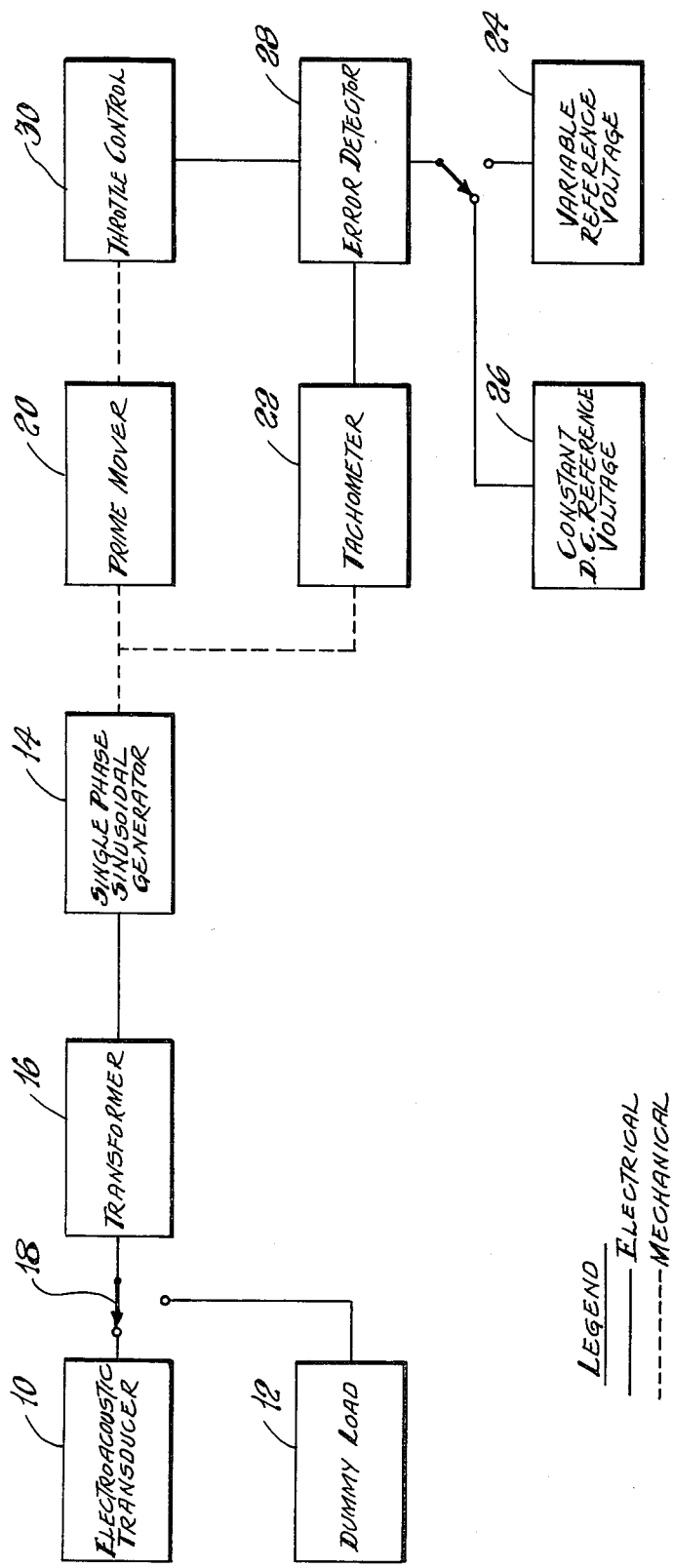

LONG DISTANCE UNDERWATER COMMUNICATION

This invention relates to underwater acoustic communication and more particularly to a novel arrangement and method of powering an electroacoustic transducer for transmitting a readily recognizable message acoustically through sea water over a long distance. One application of this invention is for message transmission from a shore station to submarines on duty.

Sea water can propagate very low frequency acoustic energy over very long distances. For example, acoustic energy 300–400 cycles per second generated at the transducer at a power level over 100 kilowatts can be transmitted over 1000 miles. The speed of sound in sea water is on the order of 0.8 nautical miles per second or about 20 minutes for 1,000 miles. If time is an important factor as in transmitting messages to submarines, it is not practical to design for transmission distances longer than 1,000 miles though it is possible to do so.

A major problem in sending messages acoustically through sea water is the noise level sensed in this band by the receiver on the submarine. For the most part the noise level is the self-noise of the submarine itself. This noise includes many spectral components in the very low frequency band generated by the multitude of machinery components within the submarine. Besides self noise, there is considerable noise in the sea originating from a variety of sources that can interfere with, mask, or drown out a very low frequency signal. In Fundamentals of Sonar, by J. W. Horton, published by U.S. Naval Institute, Annapolis, Md., pages 57–72, there is a discussion of various kinds of acoustic energy in the sea. Therefore, any intelligence imparted to the sea on very low frequency acoustic wave energy for long distance transmission must be of a character clearly discernible from self noise at the receiver and other interfering acoustic energy present in the sea in the vicinity of the receiver.

In United States patent application Ser. No. 285,556, filed May 31, 1963, by Warren A. Tyrrell for Underwater Low Frequency Sonic Communication, now U.S. Pat. No. 3,811,106, assigned to the United States Government, there is described acoustic signals that may be described as slow FM. In that case, messages are made up of a succession of signal characters each of which occupies frequency bands several cycles wide and below 500 cycles per second. The several cycle frequency band for each signal character is swept at a slow linear rate, e.g., two cycles per second per minute, for a period one to five minutes duration. Two signal characters can be transmitted in each band. Sweeping the band in the direction of increasing frequency provides one signal character and sweeping the band in reverse direction provides another signal character. A band on the order of six cycles is suitable for this purpose but may be narrower or considerably wider.

A signal character of the type described can be detected in the presence of considerable noise. The submarine is equipped with a low frequency omnidirectional hydrophone, amplifiers and an equipment of the general type disclosed in U.S. Pat. No. 2,996,667. The equipment includes a paper recorder. The paper advances longitudinally several inches an hour in short steps, at a rate of a minor fraction of a minute per step. During each step the paper is stationary and a writing element completes a traverse normal to the length of the paper. The length of the paper provides a time base and the width of the paper constitutes a linear frequency ordinate for a predetermined band. The writing element is synchronized with a spectrum analyzer whereby during each traverse the writing element records only if energy is present at the hydrophone at that frequency corresponding to the position of the writing element between the margins of the recording paper. The recorder operates with intensity modulation. A six cycle band swept linearly in three minutes as described above records as a slant line on the paper and is clearly distinguishable from background noise even of comparable or higher intensity.

Laboratory evidence and experience supports this slant line format as an optimum underwater communication code. The detection threshold of a straight slant line on such a record is improved about 1.5 to 2 db per doubling of line length. The choice of the length of individual characters in a code is intimately related to the prevailing signal levels and noise background. However, if the line is not approximately straight, the advantage gained by line lengthening toward discerning the slant line against the recorded background noise is lessened.

If the number of characters or vocabulary elements in the code is to be ten, for example, the total band for the ten is five times the sub-band required for one character. Each sub-band is used for two characters, one sloping in the direction of increasing frequency and one sloping in the direction of decreasing frequency. The five sub-bands are of equal width and contiguous. To facilitate distinguishing recorded characters the width dimension of the paper record is divided by parallel longitudinal lines into five equal parts. In a recorder of the type previously described, the period of each traverse of the writing element is on the order of several seconds. If the time interval between the end of one message character and the beginning of the next message character is less than the period of the writing element, the writing element may not record a single mark on the record that corresponds to a frequency between the two message characters. If the maximum time interval is ten seconds, the mark or marks recorded in this interval while the transmitted frequency is shifting to the starting frequency of the next message character do not interfere with recognition of the slant-line message characters.

An object of this invention is to provide a reliable, practical, durable, and generally satisfactory method and apparatus for transmitting acoustically a single swept frequency signal or for transmitting a message comprising a plurality of swept frequency signal characteristics as described.

Other objects and advantages will appear from the following description of an example of the invention, and the novel features will be particularly pointed out in the appended claims.

The single FIGURE is a simplified block diagram of an underwater acoustic transmitting apparatus embodying this invention.

In its broader aspects this invention concerns delivering acoustic power to the sea by coupling a single phase alternating current generator to an electroacoustic transducer and employing a prime mover and a speed varying control to drive the generator at a slow linear rate of change of speed. The generator delivers both the power and the swept frequency signals to the transducer.

The equipment illustrated in the block diagram includes an electroacoustic transducer 10, and a dummy load 12 having approximately the same impedance characteristics as the transducer. A single phase sinusoidal generator 14 is coupled to one or the other by a transformer 16 and a switching device 18. A prime mover 20 is direct coupled to and drives the generator 14. A tachometer 22 is coupled to the engine or generator shaft and generates a voltage directly proportional to rotor speed. The voltage from the tachometer and a source of variable reference voltage 24 or a source of constant D.C. voltage 26 is coupled to an error detector 28. The error detector is coupled to a throttle control 30. Though the equipment illustrated in the drawing may be designed for low power capacity, it has particular utility if designed for generating acoustic power of upward of one hundred kilowatts for acoustically transmitting messages through seawater up to 1,000 miles.

A transducer suitable for this purpose is an electrostrictive cylindrical transducer of the type disclosed in U.S. Pat. No. 3,043,967, and designed for operation below 500 cycles per second in a frequency band up to 100 cycles wide, preferably 50-100 cycles wide. The dummy load is designed to have approximately the same impedance characteristics as the transducer and serves to load the generator while the generator is brought up to speed and during the time no message is transmitted. The dummy load also permits verification of system capability without putting a signal into the water.

To obtain engine and generator for the purpose described, it is merely necessary to provide performance specifications to any manufacturing company that in the regular course of business supplies electric power generator units.

Various types of prime movers may be used in this equipment. A diesel has an advantage in that the throttle in a diesel is comparatively linear facilitating linear rates of change of speed. Other characteristics of diesels such as size, reliability, and safety favor their use for the purpose described. One requirement for the diesel and its flywheel is that it have a low coefficient of fluctuation, e.g., 1:20,000 to minimize jitter in the output signal. Coefficient of fluctuation is defined as maximum speed less the minimum speed divided by the average speed. This is largely a flywheel design problem well within the state of the art. The generator shaft and the diesel shaft are direct coupled so that the generator rotor operates as an added flywheel and experience has shown that it is effective in improving the coefficient of fluctuation to the order of 1:80,000. Another necessary requirement is that the crankshaft be free from torsionals and criticals over the entire working range. This is a generally standard requirement in this art.

The speed and power requirements of the engine are dependent upon the generator. The generator should supply essentially sinusoidal output as a function of angular displacement, e.g. RMS harmonic content less than 10%. The output frequency is directly related to the product of number of pole pairs and RPM. In the present state of the art, 2000 RPM is the upper end of the commercial range of operating speeds for diesels and about 1800 RPM is common for generators. Therefore, it is advantageous to design the generator 14 for operation at about 1800 RPM. Twelve pole pairs and a medium speed of 1750 RPM will produce a median frequency of 350 cycles per second. The generator and the diesel must be capable of continuous safe operation at a speed corresponding to the maximum working frequency, and must safely withstand momentary speeds up to 25% above the maximum working speed of the engine-generator set. The generator shall have sufficient KVA capacity to supply the power and losses, taking into account the power factor which is leading and low for an electrostrictive transducer. For convenience, the generator may be designed for a nominal voltage and transformer 16 than is designed to match the generator to the transducer. The diesel shall have a horsepower-speed characteristic such that at the minimum operating speed it will have sufficient horsepower to supply the load plus sufficient reserve to accelerate to the maximum operating speed in several seconds (e.g. 10 seconds). The generator may include a standard commercial excitation system and regulation system.

Elements 22, 24, 26, and 28, together function as a governor. Electric governor speed control units are marketed commercially. Basically they include a tachometer, an error detector, a constant direct current reference voltage, and throttle control means. In place of a constant reference voltage, this invention includes a source of variable reference voltage. The tachometer 22, the variable reference voltage 24, the error detector 28, and throttle control 30 serve as a means for controlling the engine speed in steps for changing the frequency of the generated power from any one of a plurality of equally spaced frequency steps within the band about six cycles apart to any other of the frequency steps within the band in less than ten seconds and then changing frequency at an essentially linear rate of two cycles per second per minute in a fixed length of time on the order of one to five minutes duration to the next higher or lower frequency step and then in less than ten seconds thereafter setting the frequency at any of the frequency steps within the band and changing frequency at an essentially linear rate in the same fixed length of time to the next higher or lower frequency step. The variable reference voltage for a selected signal or message may be prerecorded on tape and switched on as needed. When no message is transmitted and the equipment is operating, the constant D.C. reference voltage 26 corresponding to median speed is coupled to the error detector.

It will be understood that various changes in the details, materials and arrangements of parts (and steps), which have been herein described and illustrated in order to explain the nature of the invention, may be made by those skilled in the art within the principle and scope of the invention as expressed in the appended claims.

I claim:

1. A transmitter for use in long distance underwater communication comprising:
   (a) an electrostrictive transducer operable for radiating at least one hundred kilowatts of acoustic power into sea water in a frequency band fifty to one hundred cycles wide about a median frequency below five hundred cycles per second,
   (b) an alternating current generator for supplying essentially sinusoidal electric signal power to the transducer,
   (c) a dummy load approximating the load characteristics of the transducer,
   (d) a transformer for coupling output power of the generator to one of the transducer and dummy load, (e) a switching device between the transformer and the transducer and dummy load, (f) an engine directly coupled to the alternator and operable with said generator at a very low coefficient of fluctuation, on the order of 1 part in 80,000, (g) and means for controlling the engine speed in steps for changing the frequency of the generated power from any one of a plurality of equally spaced frequency steps within the band about six cycles apart to any other of the frequency steps within the band in less than ten seconds and then changing frequency at an essentially linear rate of two cycles per second per minute in a fixed length of time on the order of one to five minutes duration to the next higher or lower frequency step and then in less than ten seconds thereafter setting the frequency at any of the frequency steps within the band and changing frequency at an essentially linear rate in the same fixed length of time to the next higher or lower frequency step.

* * * * *